United States Patent [19]

Ide et al.

[11] Patent Number: 4,991,816
[45] Date of Patent: Feb. 12, 1991

[54] DAMPER UNIT FOR AUTOMOTIVE POWER UNIT OR THE LIKE

[75] Inventors: Takanobu Ide, Isehara; Masamitsu Kojima; Masami Mochimaru, both of Fujisawa, all of Japan

[73] Assignees: Nissan Motor Co., Ltd.; Oiles Corporation, both of Japan

[21] Appl. No.: 361,350

[22] Filed: Jun. 5, 1989

[30] Foreign Application Priority Data

Jun. 6, 1988 [JP] Japan ............................. 63-138667

[51] Int. Cl.$^5$ ............................................ F16M 13/00
[52] U.S. Cl. .................................. 248/562; 248/636; 248/638
[58] Field of Search .............. 248/562, 636, 564, 638, 248/659, 564, 567; 188/306, 307; 267/140.1

[56] References Cited

U.S. PATENT DOCUMENTS

| 1,522,380 | 1/1925 | Morsch . | |
|---|---|---|---|
| 1,856,325 | 5/1932 | Flentje . | |
| 2,094,304 | 9/1937 | Salenius | 188/306 |
| 2,243,713 | 5/1941 | Maruhn | 248/7 |
| 2,589,820 | 3/1952 | Konchan | 403/226 X |
| 2,629,127 | 2/1953 | Conklin et al. | 188/306 X |
| 3,329,453 | 7/1967 | Patton | 403/225 |
| 4,136,787 | 1/1979 | Forster | 403/226 X |
| 4,503,952 | 3/1985 | Hesse | 188/306 |

FOREIGN PATENT DOCUMENTS

| 3723239 | 2/1989 | Fed. Rep. of Germany | 188/306 |
|---|---|---|---|
| 2173441 | 9/1973 | France . | |
| 6314036 | 1/1988 | Japan . | |

Primary Examiner—J. Franklin Foss
Attorney, Agent, or Firm—Leydig, Voit & Mayer

[57] ABSTRACT

A damper comprises housing in which a disc is immersed in a highly viscous liquid, and a linkage which has universal joints formed at each end thereof. The linkage arrangement ensures the maximum amount of relative rotation between the housing and the disc.

14 Claims, 8 Drawing Sheets

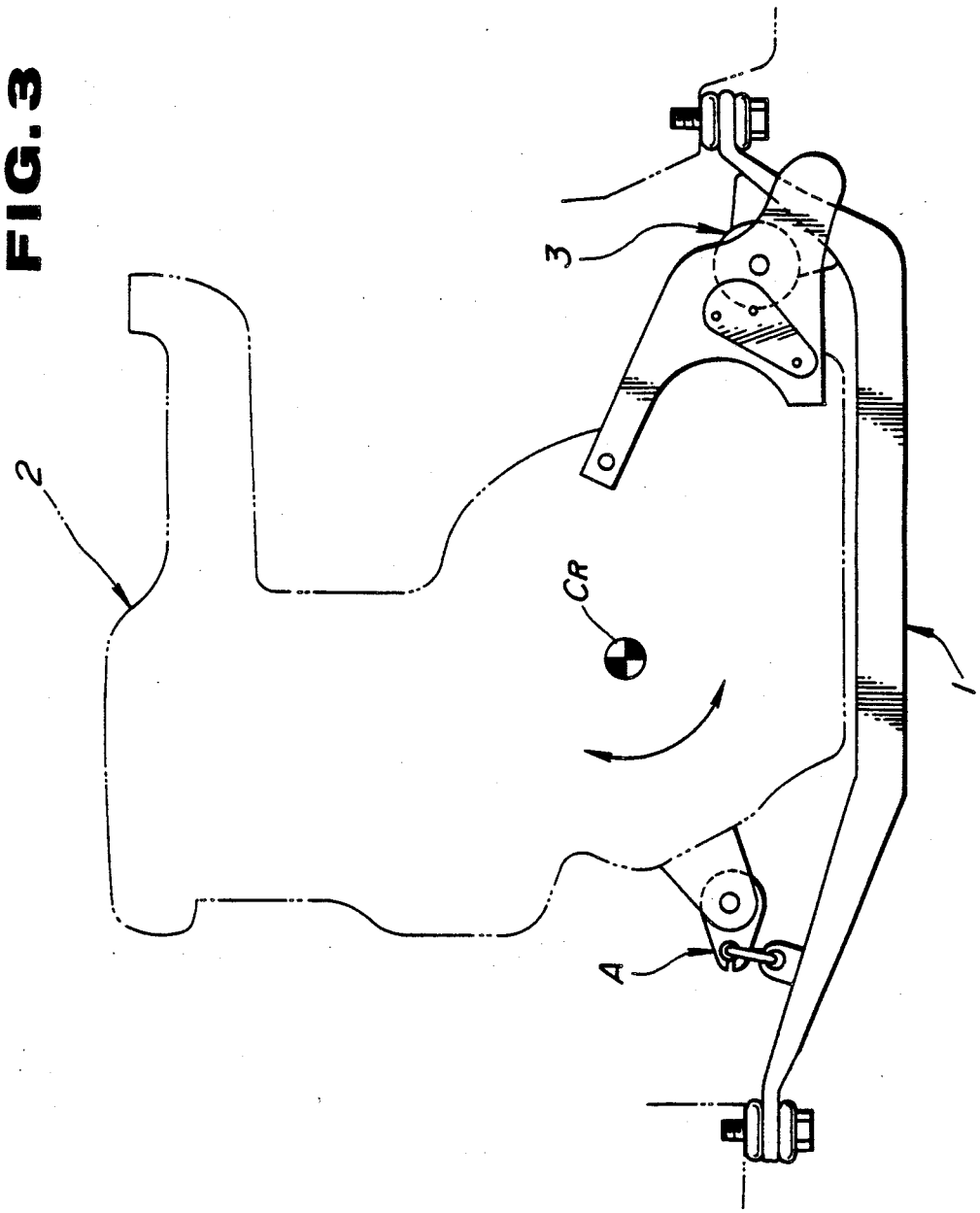

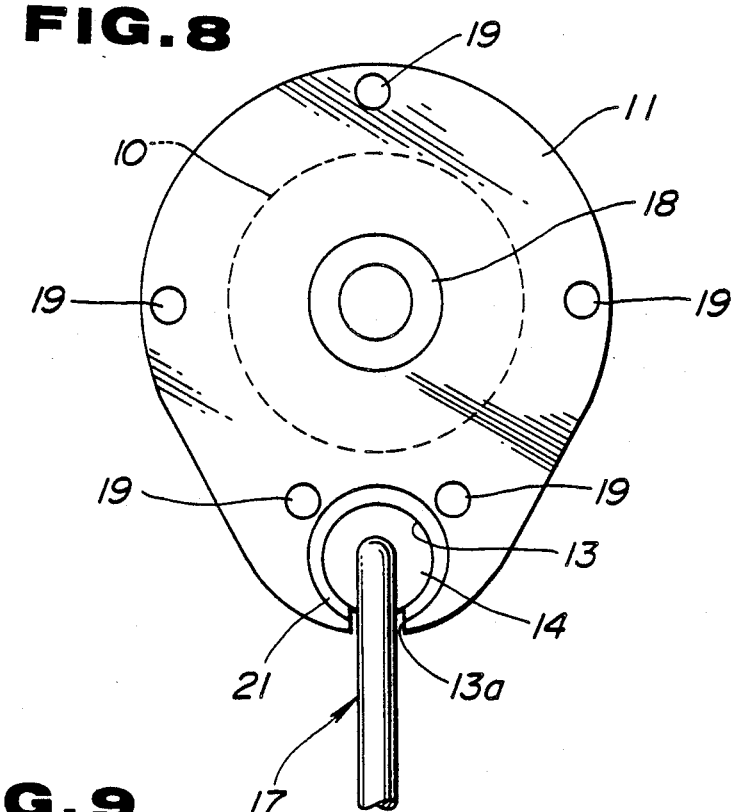
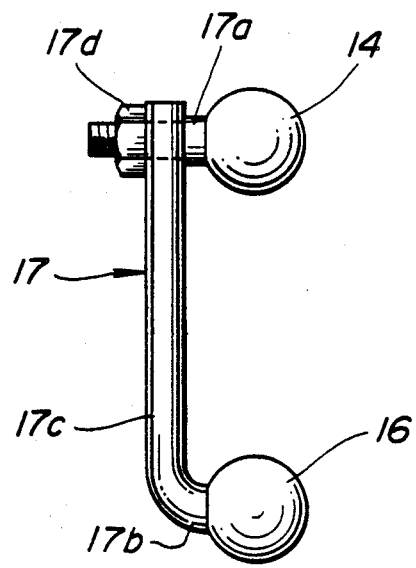
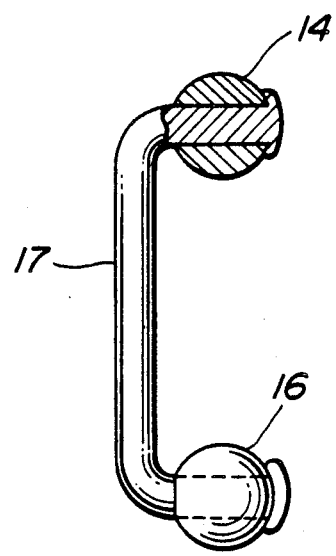

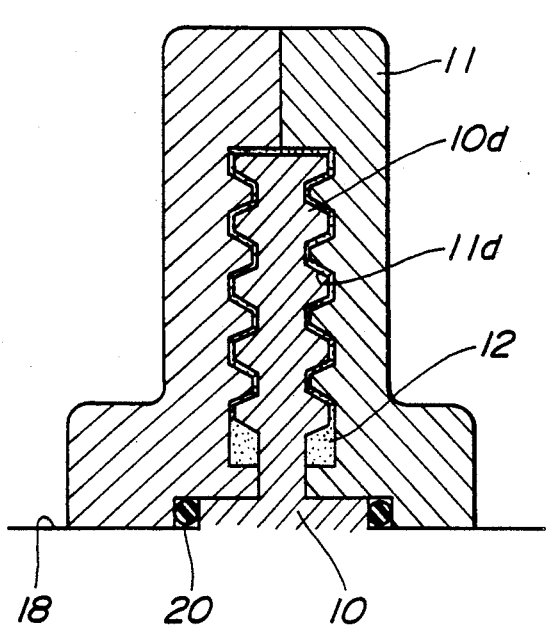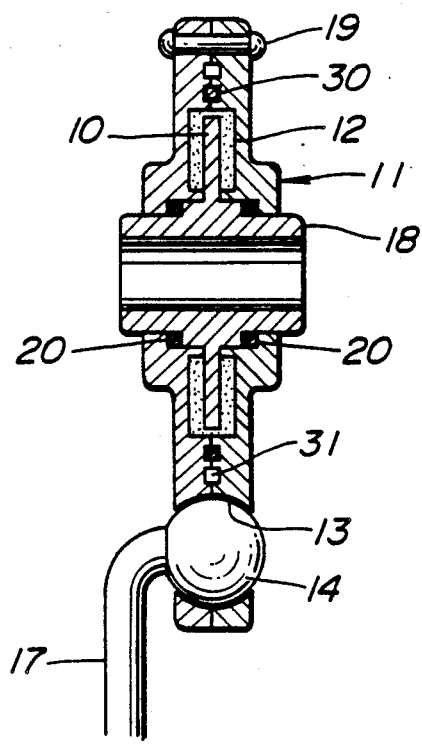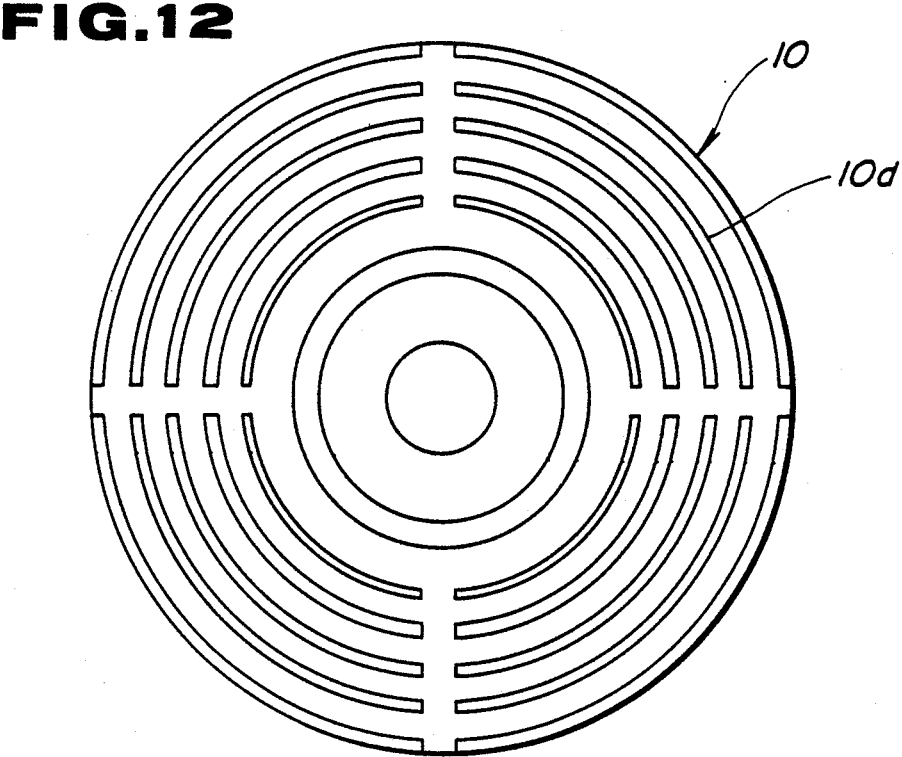

DAMPER UNIT FOR AUTOMOTIVE POWER UNIT OR THE LIKE

BACKGROUND OF THE INVENTION

1. Field of the Invention

The present invention relates generally to a damper for supporting a power unit (combination of engine and transmission) and more particularly to a damper arrangement which attenuates roll vibration using viscous shearing resistance.

2. Description of the Prior Art

JP-A-63-14036 discloses a damping arrangement wherein a circular plate or disc is mounted on a shaft or similar member which is rigidly connected with the power unit. The plate is disposed in a circular housing or casing in a manner to be immersed in a viscous fluid. The casing is connected to the vehicle chassis by way of a linkage which induced relative rotation between circular disc and the circular housing.

However, this arrangement has suffered from the drawback that the power unit is supported on the chassis by elastomeric members in a manner to be simultaneously movable in a plurality of directions, the power unit does not just move in the role direction but tends to move randomly in different directions in addition to the roll one. Accordingly, the actual device is required to include a linkage which has:

1. a connecting member which is made of flexible plate and which acts a spring link; or
2. at least one elastomeric bush between the casing and the chassis; or
3. a combination of a flexible link and elastomeric bushes.

In the case a spring link is used, while the spring link is subject to tractive forces, there is no problem, however, when the link is subject to compressive forces, the link tends to flex and thus reduce the relative rotation between the housing and the disc. This of course reduces the effectiveness of the damper.

In the case wherein one or more elastomeric bushes are used, when rolling motion of the engine occurs, the bushes distort in a manner which reduces the amount of relative rotation which is produced between the disc and the housing and thus again the damper is not used to its full potential.

A combination of elastomeric bushes and a flexible connector only increases the problem and markedly reduces the amount of relative rotation which is induced.

SUMMARY OF THE INVENTION

It is an object of the present invention to provide an arrangement which enables the maximum amount of relative rotation to be produced between a disc and a housing in a viscous shear type damper device.

In brief, the above object is achieved by an arrangement which features a housing in which a disc is immersed in a highly viscous liquid, and a linkage which has universal joints formed at each end thereof. The linkage arrangement ensures the maximum amount of relative rotation between the housing and the disc.

More specifically, the present invention is deemed to comprise a vibration damper which features: a housing, the housing including a chamber, the chamber being filled with a viscous fluid, the housing being so constructed and arranged as to be connectable to a first structure; a disc, the disc being disposed in the housing in manner to be immersed in the viscous liquid; a rigid link, the link extending between the housing and a second structure; means defining a first universal joint, the first universal joint operatively interconnecting a first end of the link with the housing; and means defining a second universal joint, the second universal joint being arranged to connect a second end of the link to a second structure.

BRIEF DESCRIPTION OF THE DRAWINGS

FIG. 3 is a front elevation showing the disposition of a damper according to the present invention used to mount an engine and transmission (so called power unit) on a vehicle chassis member;

FIG. 8 is a front elevational view showing a fourth embodiment of the present invention which features the provision of a ball seat which cooperates with one of the balls formed on the connection linkage;

FIGS. 9 and 10 are elevations showing various constructional variations of the connection linkage;

FIGS. 11 and 12 are views showing the construction which characterizes a fifth embodiment of the present invention; and FIG. 13 is a sectional elevation showing a construction which characterizes a sixth embodiment of the present invention.

DETAILED DESCRIPTION OF THE PREFERRED EMBODIMENTS

FIG. 3 shows a power unit damper A according to the present invention operatively connected to a power unit (viz., engine and transaxle combination). As shown the damper is connected between a center member 1 and a power unit 2. The power unit 2 is further operatively connected with a power unit mount 3 in a manner to support the power unit in the illustrated manner.

Figure 1:
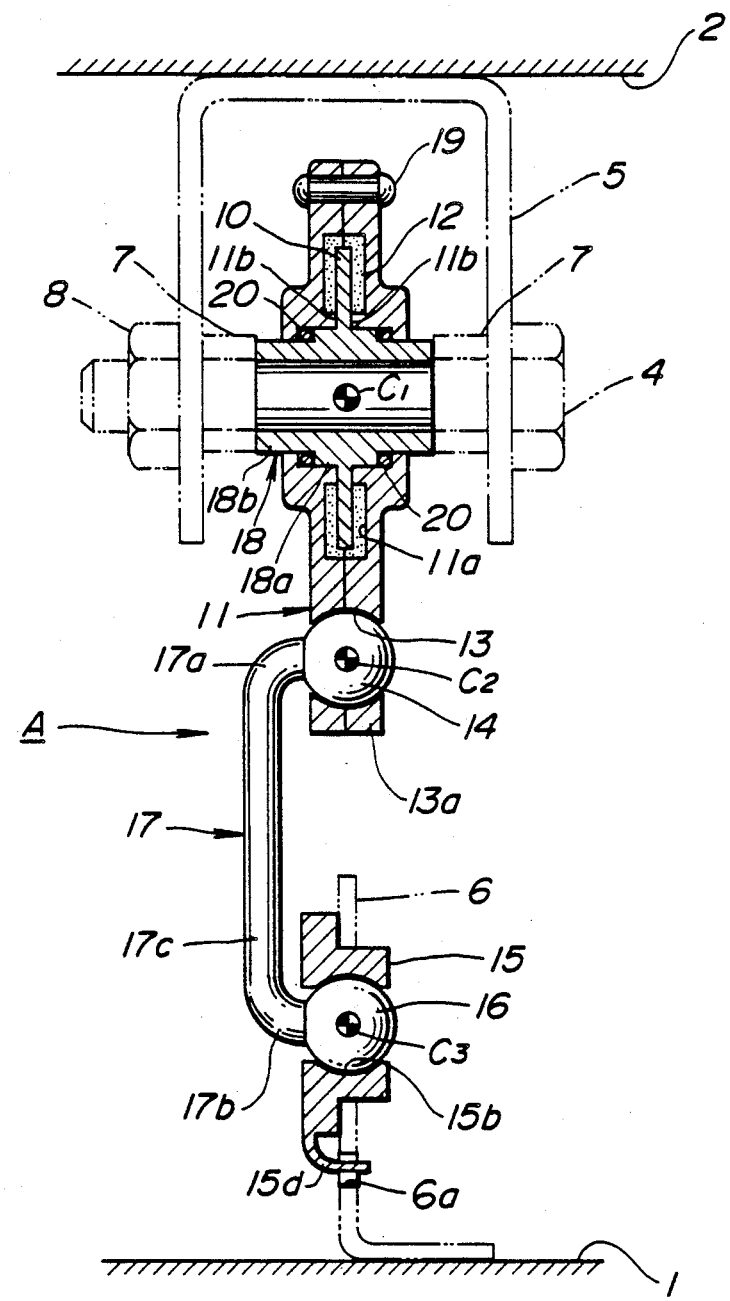
FIGS. 1 and 2 are front (sectional) and side elevations showing an embodiment of the present invention.
Figure 2:
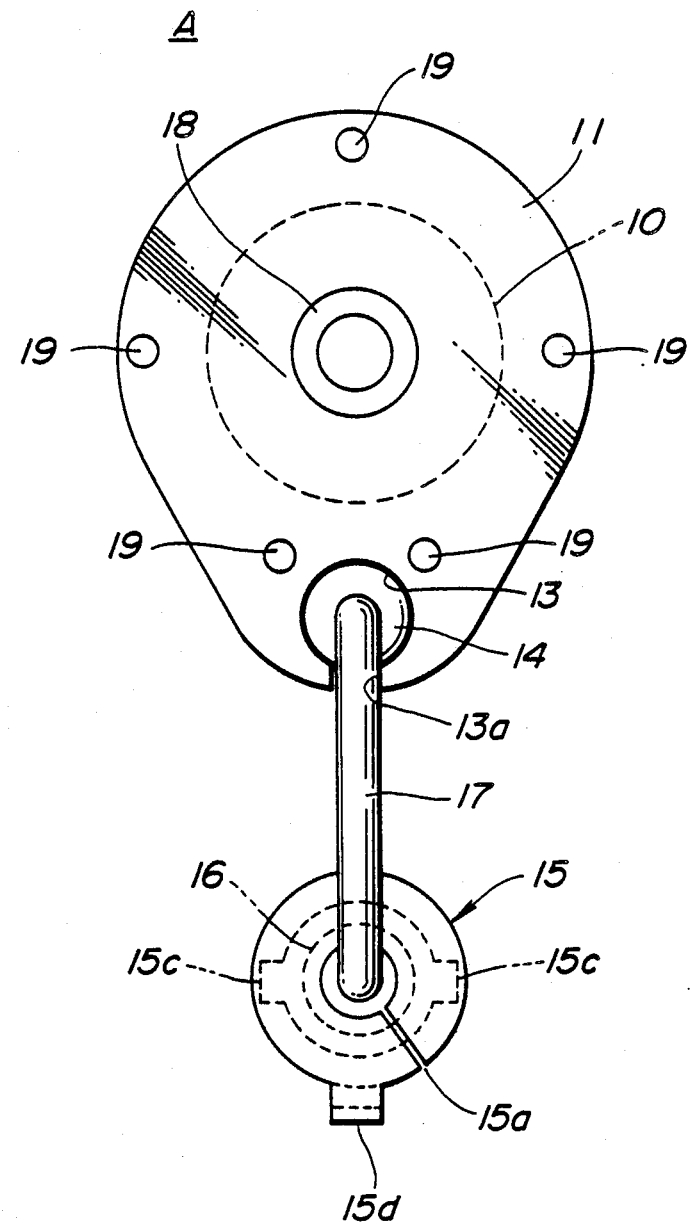

FIGS. 1 and 2 show the construction of the damper A in detail. As will be noted in this embodiment the main body of the damper is supported on a bolt 4 which is detachably connected to a bracket 5 connected to the power unit 2.

An annular disc 10 is disposed within casing 11 which is so constructed and arranged as to define an annular chamber 11a. This chamber is filled with a highly viscous silicon oil 12. The lower portion of the housing is formed with a ball seat 13 in which a spherical ball 14 is received. This ball 14 forms part of a link 17 which extends between the housing 11 and the center member 1. As best seen in FIG. 1, the lower end of the link 17 is formed with a second spherical ball member 16 which is received in a second ball seat 15b which is defined in connector 15.

In this embodiment the connector 15 is arranged to have a stepped configuration. The smaller diameter boss-like portion of the connector is arranged to project through an aperture formed in a bracket 6 which is secured to the center member 1. The connector is also formed with first, second and third finger like members 15c, 15c and 15d which are arranged to project through apertures formed in a bracket 6 and/or engage edge portions thereof in a manner which prevents rotation and the like relative movement between the connector 15 and the bracket 6.

A slit 15a is formed in the connector 15 which in this case is formed of a rigid synthetic resin (e.g. Actetal)

In this figure C1, C2 and C3 respectively denote the center of motion of the damper, the upper ball 14 of the link 17 and the lower ball 16 of the same. Cr denotes the center of motion of the power unit 2. As will be appreciated in the normal or home position of the arrangement the three centers align with one another.

In this embodiment the annular disc 10 is formed integrally with a stepped central boss portion 18. This plate and boss portion can be formed of aluminium, carbon steel, stainless steel or any suitable alloy. However, the material is not limited to these and any suitable other material can be used.

The link 17 and the first and second ball members 14, 16 can be formed of aluminium, carbon steel, stainless steel, a suitable alloy or the like. In the first embodiment these elements are formed as a single integral unit.

The disc 10 is arranged to extend from a large diameter portion 18a of the boss, while the steps defined between the large and small diameter portions are arranged receive O-ring seals 20. The first and second halves of the housing 11 are secured together by way of rivets 19 and arranged to cooperate with the large and small diameter portions of the boss in a manner to enclose the O-ring seals in the illustrated manner. These halves are also formed with annular flanges 11b which extend parallel to the periphery of the large diameter portion 18a and toward the surfaces of the disc 10. These flanges terminate at locations which are proximate the disc and thus enclose the silicon oil 12 in the annular chamber 11a.

As the bearing surfaces 13 which define the ball seat are formed integrally in the members which define the casing 11, they preferably exhibit good heat resistance, sliding resistance and adequate mechanical strength. By way of example only, polyacetals may be used to form the same.

The casing is formed with a slit 13a which has a width which essentially the same as or slightly larger than the diameter of the center portion 17c of the link 17. The casing further is arrange to have an essentially inverted pear shape.

Figure 5:
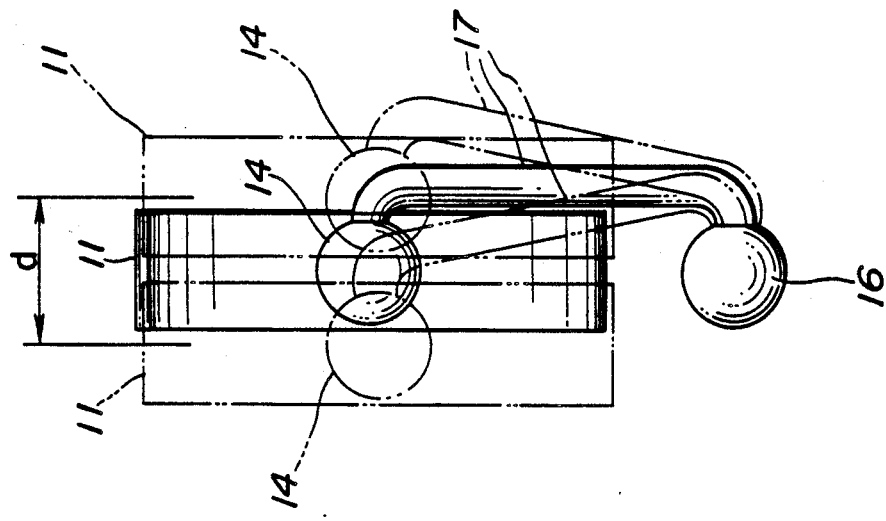
FIGS. 4 and 5 are elevational views which show the freedom of movement permitted the damper unit in response to various motions of the engine.
Figure 4:
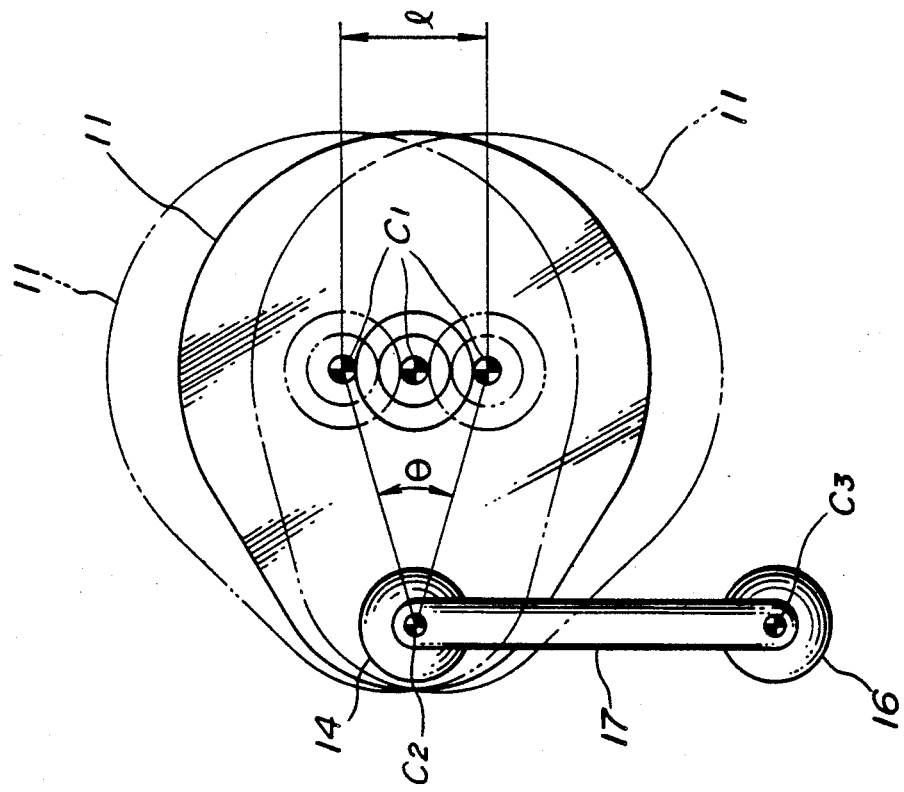

The above construction is such that depending on the direction in which the center of motion Cr of the engine moves the relative movement shown in FIGS. 4 and 5 is rendered possible.

The operation of the above described device is such that, in the case that the power unit undergoes roll vibration in the direction indicated by the arrow in FIG. 3 the motion depicted in FIG. 4 is produced. Viz., under these circumstances, the center C3 remains in place while the center C1 is displaced through a distance 1. As a result the link 17 remains essentially stationary and the relative movement between centers C1 and C2 is such as to induce the disc to rotate through an angle c with respect to the casing 11. Accordingly, the maximum relative movement between the disc 10 and housing 11 whereby the movement of the disc through the viscous fluid 12 attenuates the rolling the reduces the amount of vibration transmitted to the center member 1.

However, as will be appreciated, there will be essentially no time when only the above described rolling vibration alone occurs. Viz., the power unit will tend to vibrate in a random number of directions simultaneously.

However, with the construction according to the first embodiment, the movement shown in FIG. 5 is also rendered possible. Accordingly, even though the center C2 is displaced laterally with respect to the center C3 in a manner which brings the C3 center out of alignment with C1 and C2 essentially no effective reduction in the relative rotation between the disc 10 and the casing 11 occurs and therefore the loss of roll damping experienced with the earlier discussed prior art is not experienced.

With the first embodiment of the invention the following effects are achieved.

Firstly, as the link 17 is formed of a rigid inflexible material, and the universal type joints provided at each end thereof permit random displacement between the power unit 2 and the center member 1 the loss of roll damping depending on the direction in which the displacement occurs is obviated.

As the ball 14 is seated in the ball seat provided in the casing 11 in a manner wherein essentially no relative displacement therebetween, it is not necessary to provide special ball seat members. This simplifies the construction and lowers the cost of the device. Space is further conserved and adequate structural strength provided to handle the forces transmitted between the power unit and the center member.

The material in which the ball seat surfaces 13 are formed is selected so that the sliding resistance and friction which between the seat surfaces and the surfaces of the metallic spherical ball 14 is low and therefore tends to minimize frictional resistance.

The centers C1, C2 and Cr are not subject to relative displacement relative to one another, no moments are applied to the casing 11 and the longevity of the same is assured.

As the rotating parts of the device are not subject to twisting forces even under high roll vibration, the maximum roll damping effect is realized. Further, the absence of twisting forces prolongs the life of the O-rings and therefore assures that the device exhibits a long working life free of leakage and the like.

The balls 14, 16 and and shaft which constitute the link 17 can be readily and economically formed of aluminium or the like rigid material.

The disc 10 and center boss member 18 can be formed integrally in a manner which assures a permanent connection between the two parts, the changes of breakage are minimized along with an inherent compact configuration.

The stepped configuration of the center boss portion 18 permits the O-rings to be disposed in locations which resiliently support the rotating element within the casing 11 in a manner wherein frictional between casing and the rotating elements tends to be minimized.

Even when the centers C1, C2 and Cr are moved out of alignment with center C3 the arrangement of the bracket 6 is prevented from being subject to twisting and bending forces.

As the connector 15 is formed with the slit 15a is easy to snap the connector onto the ball 16 and then insert the same into the aperture formed in the bracket 6 and guide the finger like members 15c and 15d into place. Upon insertion into the bracket 6 expansion of the connector 15 in a manner which permits the ball 16 to come of engagement with the ball seat surfaces 15d is prevented.

Figure 6:
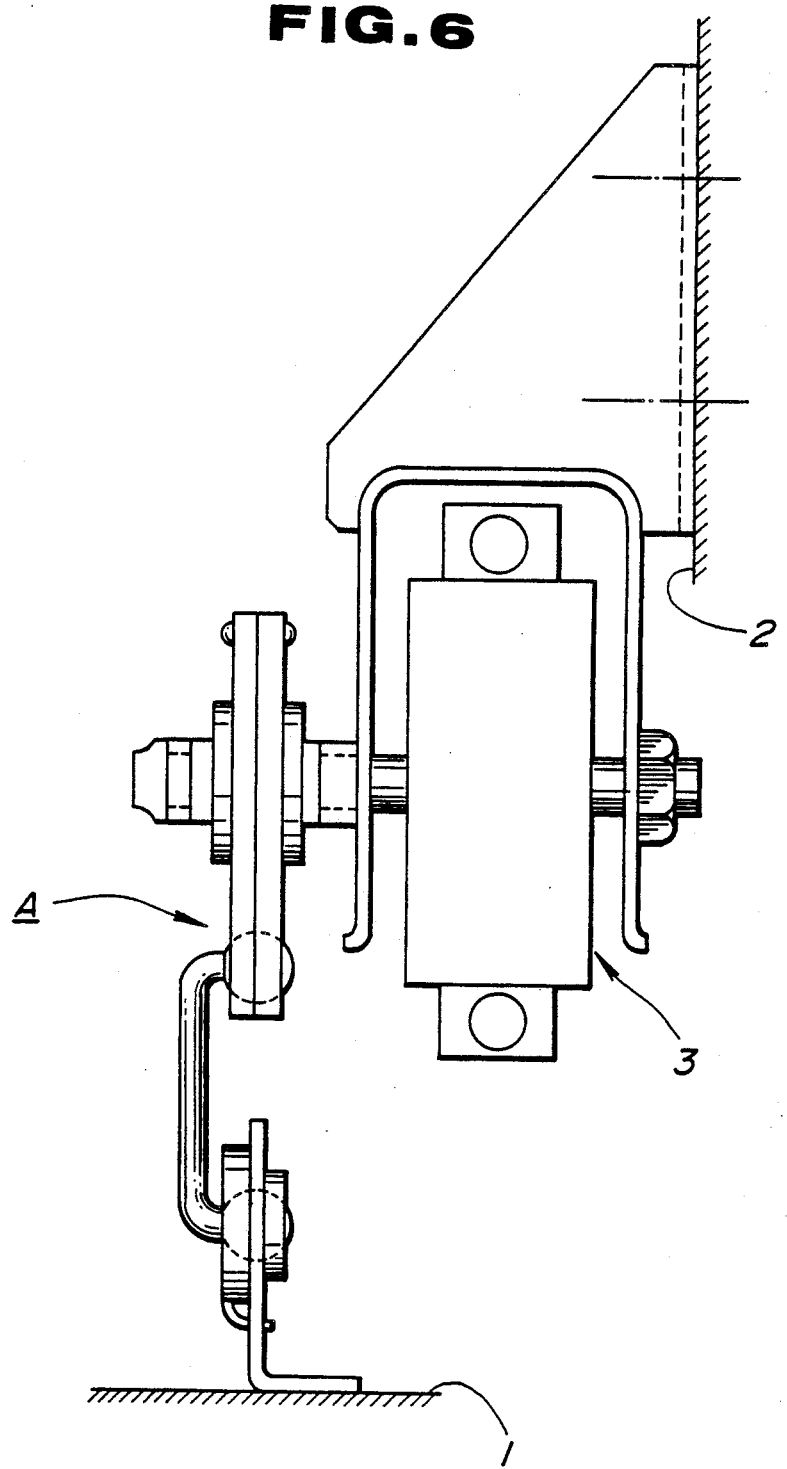
FIG. 6 is an elevational view showing a second embodiment wherein a damper according to the present invention used in combination with an elastomeric bush.

FIG. 6 shows a second embodiment of the present invention. In this arrangement the roll damper A is combined with the power unit mount 3 rather than being located at a separate site. In this arrangement the mount 3 is fixed to a suitable chassis member not shown.

Figure 7:
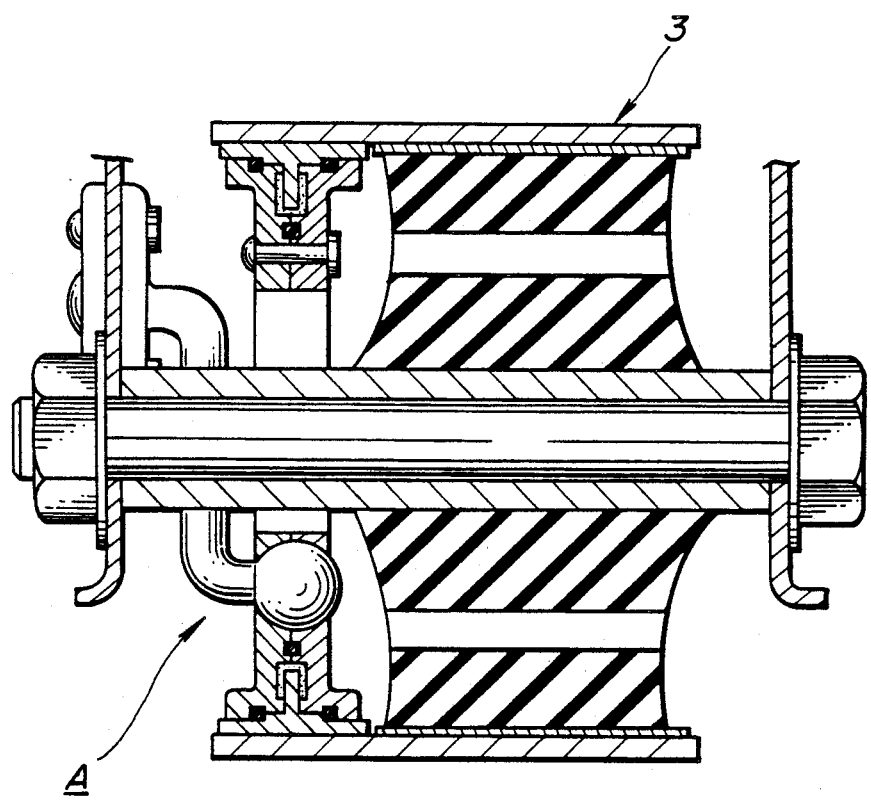
FIG. 7 is a sectional view showing a third embodiment of the present invention.

FIG. 7 shows a third embodiment of the present invention. In this arrangement the connection arrangement between the inner and outer members of the engine mount.

FIG. 8 shows a fourth embodiment of the present invention. In this arrangement a ball seat member 14 is additionally provided.

FIGS. 9 and 10 show alternative constructions for the link arrangement. As will be appreciated the arrangement shown in FIG. 9 is such that the upper ball 14 is detachably connected to the link 17, while in the case of the arrangement shown in FIG. 10, both of the balls are arranged to be rotatable about the ends of the shaft member on which they are mounted.

FIGS. 11 and 12 show the construction which characterizes a fifth embodiment of the present invention. As will be appreciated from the drawings, the disc 10 is formed with a plurality of arcuate ribs 10d while the inner surface of the casing halves are formed with correspondingly shaped corrugations 11d. This arrangement increases the surface area which is subject to viscous drag and increases the attenuation of roll vibration.

FIG. 13 shows a sixth embodiment of the present invention. In this arrangement the two halves of the casing 11 are further formed with annular grooves 30, 31 in which seals can be disposed. In the illustrated embodiment a seal is disposed groove 30 in a manner which prevents the leakage of the viscous liquid from the device by way of the interface defined between the two casing halves.

What is claimed is:

1. A vibration damper comprising:
   a housing, said housing including a chamber, said chamber being filled with a viscous fluid, said housing being so constructed and arranged as to be connectable to a first structure;
   a disc, said disc being disposed in said housing in manner to be immersed in said viscous liquid;
   a rigid link, said link extending between said housing and a second structure
   means defining a first universal joint, said first universal joint operatively interconnecting a first end of said link with said housing;
   means defining a second universal joint, said second universal joint being arranged to connect a second end of said link to a second structure.

2. A vibration damper as claimed in claim 1 wherein said first universal joint comprises
   a first ball, said first ball being provided on said first end of said link; and
   means defining a first ball seat in which said first ball is receivable, said first ball seat being defined by a shaped recess formed in said housing.

3. A vibration damper as claimed in claim 2 wherein said first universal joint comprises:
   a second ball, said second ball being provided on said second end of said link; and
   means defining a second ball seat in which said second ball is receivable, said second ball seat being defined by a shaped recess formed in a connector adapted to be connected to said second structure.

4. A vibration damper as claimed in claim 3 wherein said connector takes the form
   of a stepped member, said stepped member being formed with a slit which permits stepped member to exhibit sufficient flexibility to have said second ball inserted into said shaped recess, said stepped member being adapted to be received in an aperture which prevents the stepped member from flexing in a manner which permits the ready removal of said second ball.

5. A vibration damper as claimed in claim 3 wherein said first and second balls are rigidly connected with said link.

6. A vibration damper as claimed in claim 3 wherein said first and second balls are rotatably mounted on said link.

7. A vibration damper as claimed in claim 3, wherein one of said first and second balls is detachably connected to said link.

8. A vibration damper comprising:
   a housing, said housing including a chamber, said chamber being filled with a viscous fluid, said housing being so constructed and arranged as to be connectable to a first structure;
   a disc, said disc being disposed in said chamber in a manner to be immersed in said viscous liquid;
   means defining a first universal joint, said first universal joint comprising a first ball which is retained in a first ball seat defined in said housing, said ball having a center of motion;
   means defining a second universal joint, said second universal joint comprising a second ball which is retained in a shaped recess formed in a connector adapted to be connected to a second structure, said second ball having a second center of motion; and
   a link interconnecting said first and second balls, said link having an essentially straight center portion and first and second bent end portions which are angled with respect to the center portion and which are connected to said first and second balls respectively.

9. A vibration damper as claimed in claim 8 wherein said center portion is arranged such that it is offset with respect to the first and second centers of motion.

10. A vibration damper as claimed in claim 8 wherein said center portion is arranged such that it is offset from and parallel with a line which passes through said first and second centers of motion.

11. A vibration damper as claimed in claim 8 wherein the combination of said disc and said housing have a third center of motion, said first, second and third centers of motion being alignable along a straight line.

12. A vibration damper as claimed in claim 8 wherein said connector has a shaped recess which defines a ball seat for receiving the second ball, said connector being formed with a slit which permits the connector to be expanded to the degree that the second ball can be forced into and retained in the shaped recess, said connector further having projections which can be inserted into an apertured bracket in a manner which immovably secures the connector to the bracket and prevents said connector from expanding to the degree that the second ball can escape from said shaped recess.

13. A vibration damper comprising:
   a housing, said housing including a chamber, said chamber being filled with a viscous fluid, said housing being so constructed and arranged as to be connectable to a first structure, said housing being formed with a plurality of annular corrugations;

a disc, said disc being disposed in said housing in a manner to be immersed in said viscous liquid, said disc being formed with a plurality of arcuate ribs which cooperate with the annular corrugations formed in said housing;

a rigid link, said link extending between said housing and a second structure;

means defining a first universal joint, said first universal joint operatively interconnecting a first end of said link with said housing; and means defining a second universal joint, said second universal joint being arranged to connect a second end of said link to the second structure.

14. A vibration damper as claimed in claim 13 wherein only a single disc is enclosed in said housing.

* * * * *